United States Patent
Wallman

(10) Patent No.: US 10,838,792 B1
(45) Date of Patent: Nov. 17, 2020

(54) SYSTEMS AND METHODS FOR RECONSTRUCTING NOISE FROM PAULI FIDELITIES

(71) Applicant: Quantum Benchmark, Inc., Kitchener (CA)

(72) Inventor: Joel J. Wallman, Kitchener (CA)

(73) Assignee: Quantum Benchmark, Inc., Kitchener (CA)

( * ) Notice: Subject to any disclaimer, the term of this patent is extended or adjusted under 35 U.S.C. 154(b) by 70 days.

(21) Appl. No.: 16/293,365

(22) Filed: Mar. 5, 2019

Related U.S. Application Data

(60) Provisional application No. 62/639,986, filed on Mar. 7, 2018.

(51) Int. Cl.
 *G06F 11/07* (2006.01)
 *G06F 17/18* (2006.01)
 *G06F 17/16* (2006.01)
 *G06N 10/00* (2019.01)

(52) U.S. Cl.
 CPC .......... *G06F 11/0715* (2013.01); *G06F 17/16* (2013.01); *G06F 17/18* (2013.01); *G06N 10/00* (2019.01)

(58) Field of Classification Search
 CPC ...... G06F 11/0715; G06F 17/16; G06F 17/18; G06N 10/00
 See application file for complete search history.

(56) References Cited

U.S. PATENT DOCUMENTS

| | | | |
|---|---|---|---|
| 5,768,297 A | 6/1998 | Shor | |
| 8,219,871 B2 | 7/2012 | Roetteler | |
| 9,361,169 B2 | 6/2016 | Berkeley | |
| 9,934,468 B2 | 4/2018 | Mohseni | |
| 9,944,520 B2 * | 4/2018 | Ashikhmin | ............ G06N 10/00 |
| 10,031,791 B1 | 7/2018 | Wallman | |

(Continued)

FOREIGN PATENT DOCUMENTS

| | | |
|---|---|---|
| AU | 2013277927 | 1/2015 |
| WO | WO 2009/117003 A1 | 9/2009 |
| WO | WO 2013/188910 A1 | 12/2013 |

OTHER PUBLICATIONS

Blume-Kohout, Robin, "Optimal, reliable estimation of quantum states", Apr. 20, 2010, New Journal of Physics 12, pp. 1-24 (Year: 2010).*

(Continued)

*Primary Examiner* — Matthew M Kim
*Assistant Examiner* — Indranil Chowdhury
(74) *Attorney, Agent, or Firm* — Morgan, Lewis & Bockius LLP

(57) ABSTRACT

Computer systems and methods for estimating errors for a quantum system comprising a set of n qubits are provided in which $\mathbb{P}^{\otimes n}$ is the projective n-qubit Pauli group for the quantum system, and n is a fixed integer of three or greater. At least a first and second subset of Pauli matrices are identified. The Pauli fidelities $f_1$ of the first subset of Pauli fidelities are estimated. The fixed probability distribution $\omega_2$ for the second subset of Pauli matrices are reconstructed using the Pauli fidelities $f_1$ of the first subset of Pauli matrices, thereby estimating errors for the quantum system.

14 Claims, 3 Drawing Sheets

(56) References Cited

U.S. PATENT DOCUMENTS

| | | | | |
|---|---|---|---|---|
| 2004/0078421 | A1* | 4/2004 | Routt | H04L 9/0852 |
| | | | | 709/201 |
| 2009/0259905 | A1 | 10/2009 | Silva | |
| 2014/0118023 | A1* | 5/2014 | Eastin | B82Y 10/00 |
| | | | | 326/7 |
| 2015/0324705 | A1 | 11/2015 | Biercuk et al. | |
| 2017/0308803 | A1 | 10/2017 | Wallman | |
| 2018/0096085 | A1* | 4/2018 | Rubin | G06F 9/455 |
| 2018/0308007 | A1* | 10/2018 | Amin | G06N 20/00 |
| 2019/0095561 | A1* | 3/2019 | Pednault | G06F 30/33 |
| 2019/0095811 | A1* | 3/2019 | Antonio | G06N 10/00 |
| 2019/0156239 | A1* | 5/2019 | Martinis | G06N 10/00 |
| 2020/0118025 | A1* | 4/2020 | Romero | G06N 3/0445 |

OTHER PUBLICATIONS

Cramer, J. et al., "Repeated quantum error correction on a continuously encoded qubit by real-time feedback", May 5, 2016, Nature Communications, pp. 1-7 (Year: 2016).*

Aharonov, Dorit, et al. "Fault-Tolerant Quantum Computation With Constant Error Rate", Proceedings of the 29th Annual ACM Symposium on Theory of Computing (STOC), 1997, pp. 1-63.

Beigi, Salman, et al. "Simplified instantaneous non-local quantum computation with applications to position-based cryptography", Institute for Quantum Information, Caltech, Sep. 20, 2011, pp. 1-18.

Carignan-Dugas, Arnaud, et al. "Characterizing Universal Gate Sets via Dihedral Benchmarking", Institute for Quantum Computing and the Department of Applied Mathematics, University of Waterloo, Jul. 26, 2018, pp. 1-5.

Cross, Andrew W., et al. "Scalable randomized benchmarking of non-Clifford gates", IBM T.J. Watson Research Center, Oct. 8, 2015, pp. 1-9.

Dankert et al., "Exact and approximate unitary 2-designs and their application to fidelity estimation", arXiv:quant-ph10606161, Aug. 31, 2012, 6 pgs.

Emerson, J., Alicki, R., and Zyczkovvski, K., "Scalable noise estimation with random unitary operators", arXiv: quant-ph/0503243, Dec. 16, 2005. 8 pgs.

Emerson et al., "Symmetrized Characterization of Noisy Quantum Processes," American Association for the Advancement of Science, Science 317, 1893 (2007); downloaded from <http://www.sciencemag.org> on Apr. 23, 2012, 5 pgs.

Flammia, Steven T., et al. "Direct Fidelity Estimation from Few Pauli Measurements", Institute for Quantum Information, Apr. 29, 2011, pp. 1-9.

Hoeffding, Wassily, "Probability Inequalities for Sums of Bounded Random Variables", Journal of the American Statistical Association, Apr. 10, 2012, pp. 1-19.

Holevo, A.S., "Additivity Conjecture and Covariant Channels", International Journal of Quantum Information, vol. 3, No. 1, 2005, pp. 41-47.

Kern, O., Alber, G., & Shepelyansky, D.L., "Quantum error correction of coherent errors by randomization," arXiv:quant-ph/0407262, Jul. 30, 2004, 4 pgs.

Kern, O., & Alber, G., "Selective recoupling and stochastic dynamical decoupling," arXiv:quant-ph/0602167, Feb. 20, 2006, 9 pgs.

Kern, O., & Alber, G., "Controlling Quantum Systems by Embedded Dynamical Decoupling Schemes," arXiv:quant-ph/0506038, Jun. 5, 2005, 4 pgs.

Kitaev, A. Yu, "Quantum computations: algorithms and error correction", Russian Mathematical Surveys, vol. 52, No. 6, 1997, pp. 1-61.

Knill, E., "Quantum computing with realistically noisy devices," arXiv:quant-ph/0410199, Nov. 2, 2004, 47 pgs.

Knill et al., "Randomized benchmarking of quantum gates," arXiv:0707.0963 [quant-ph], Jul. 6, 2007, 13 pgs.

Lévi, Benjamin, et al. "Efficient error characterization in Quantum Information Processing", Department of Nuclear Science and Engineering, Jul. 20, 2018, pp. 1-11.

Lorenza, V., & Knill, E., "Random Decoupling Schemes for Quantum Control and Error Suppression," Physical Review Letters, PRL 94, 060502 (2005), Feb. 17, 2005, 4 pgs.

Magesan, E., Gambetta, J. M., & Emerson, J., "Characterizing quantum gates via randomized benchmarking," arXiv:1109.6887 [quant-ph], Apr. 27, 2012., 19 pgs.

Magesan, E., Gambetta, J. M., & Emerson, J., "Robust Randomized Benchmarking of Quantum Processes," arXiv:1009.3639v1 [quant-phj. Sep. 19, 2010., 5 pgs.

Magesan, Easwar, et al. "Scalable and Robust Randomized Benchmarking of Quantum Processes", Physical Review Letters, Institute for Quantum Computing and Department of Applied Mathematics, University of Waterloo, May 6, 2011, pp. 1-4.

Magesan et al., "Efficient Measurement of Quantum Gate Error by Interleaved Randomized Benchmarking,"arXiv:1203.4550v2 [quant-ph], Mar. 19, 2014, 5 pgs.

Nielsen, Michael A., "A simple formula for the average gate fidelity of a quantum dynamical operation", Centre for Quantum Computer Technology and Department of Physics, University of Queensland, Feb. 1, 2008, pp. 1-3.

Sanders, Yuval R., et al. "Bounding quantum gate error rate based on reported average fidelity", Institute for Quantum Computing, University of Waterloo, Dec. 27, 2015, pp. 1-22.

Santos, L. F., & Lorenza, V., "Enhanced Convergence and Robust Performance of Randomized Dynamical Decoupling," Physical Review Letters, PRL 97, 150501 (2006), Oct. 13, 2006., 4 pgs.

Wallman, Joel, J., et al. "Randomized Benchmarking with Confidence", Institute for Quantum Computing, University of Waterloo, Dec. 18, 2015, pp. 1-31.

Wallman, Joel, J., et al. "Estimating the Coherence of Noise", Institute for Quantum Computing and Department of Applied Mathematics, University of Waterloo, Aug. 25, 2015, pp. 1-10.

Wallman, Joel, J., et al. "Robust Characterization of Loss Rates", Institute for Quantum Computing, University of Waterloo, Waterloo, May 10, 2018, pp. 1-5.

Wallman, Joel J., et al. "Robust characterization of leakage errors", IOP Publishing, New Journal of Physics, 18, 2016, pp. 1-8.

Wallman, Joel, J., & Emerson: J., "Noise tailoring for scalable quantum computation via randomized compiling," arXiv:1512.01098v3 [quant-ph] Jun. 9, 2016.

* cited by examiner

SYSTEMS AND METHODS FOR RECONSTRUCTING NOISE FROM PAULI FIDELITIES

CROSS REFERENCE TO RELATED APPLICATIONS

This application claims priority to U.S. Patent Application No. 62/639,986, entitled "SYSTEMS AND METHODS FOR RECONSTRUCTING NOISE FROM PAULI FIDELITIES," filed Mar. 7, 2018, which is hereby incorporated by reference.

TECHNICAL FIELD

The disclosed implementations relate generally to scalable systems and methods for characterizing the noise in multi-qubit quantum information processes by reconstructing effective Pauli error rates.

BACKGROUND

Achieving the advantages of quantum computing requires overcoming the limitations imposed by a variety of error sources including noise (such as decoherence from the environment) and the finite-precision of control (which leads to coherent errors). A conventional approach to this challenge includes optimizing the design of hardware and control methods to reduce these error sources and, if possible, apply methods of error-correction during run-time to overcome residual errors. Both of these tasks require methods for identifying relevant features of the noise, such as the type and strength of the various error mechanisms. Error characterization is also relevant to determining or bounding the correctness of the ultimate output of a quantum information processor when running a particular algorithm or other computational task.

SUMMARY

The present disclosure provides systems and methods for reconstructing an unknown Pauli channel acting on a quantum computer comprising a plurality of qubits.

BRIEF DESCRIPTION OF THE DRAWINGS

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject.

The terminology used in the present disclosure is for the purpose of describing particular embodiments only and is not intended to be limiting of the invention. As used in the description of the invention and the appended claims, the singular forms a, an and the are intended to include the plural forms as well, unless the context clearly indicates otherwise. It will also be understood that the term and/or as used herein refers to and encompasses any and all possible combinations of one or more of the associated listed items. It will be further understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

As used herein, the term if may be construed to mean when or upon or in response to determining or in response to detecting, depending on the context. Similarly, the phrase if it is determined or if [a stated condition or event] is detected may be construed to mean upon determining or in response to determining or upon detecting [the stated condition or event] or in response to detecting [the stated condition or event], depending on the context.

Figure 1:
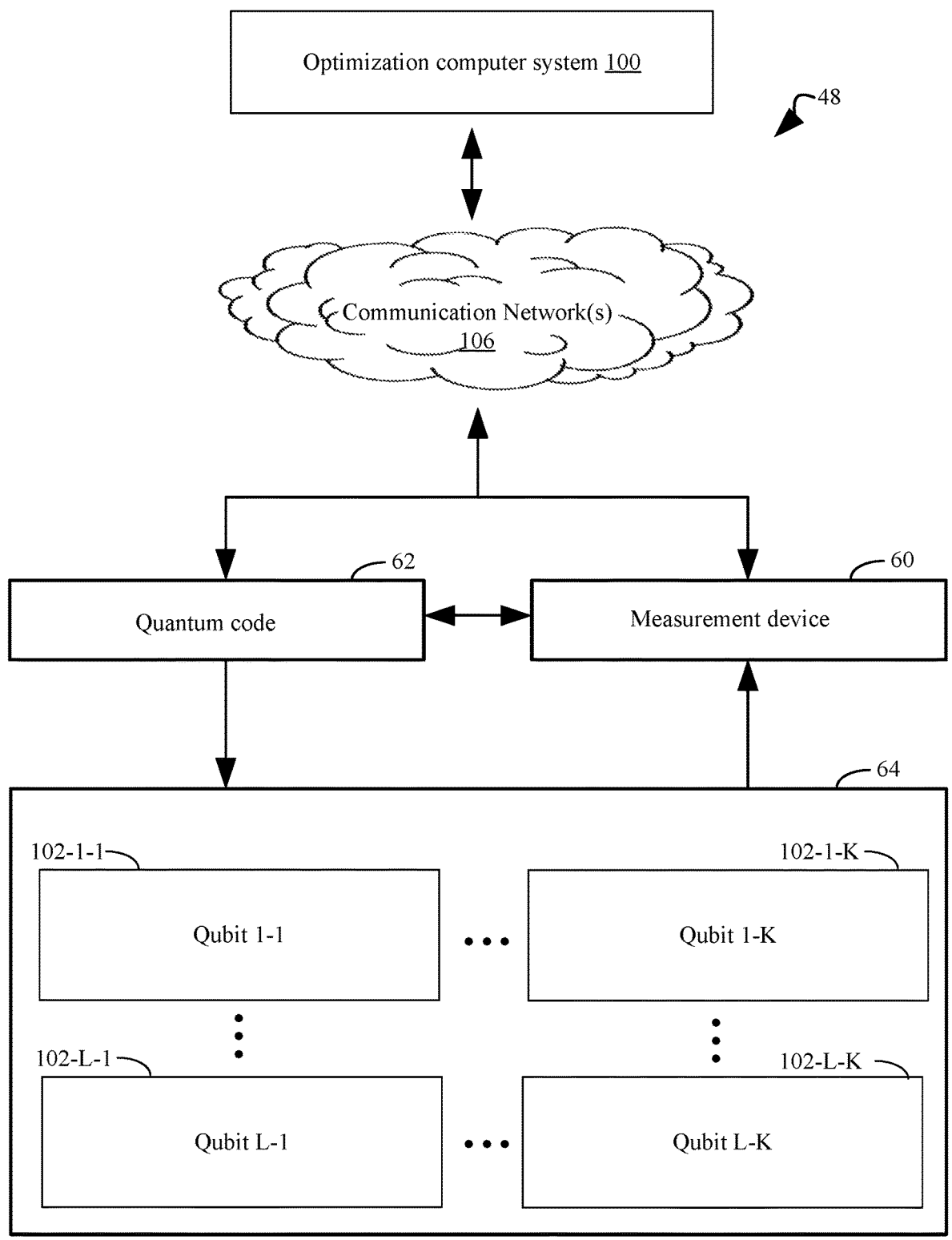
FIG. 1 is a schematic diagram showing aspects of an example system that includes a classical computer system, for estimating errors for a quantum system comprising a set of n qubits, where $\mathbb{P}^{\otimes n}$ is the projective n-qubit Pauli group for the quantum system, and the quantum systems itself in accordance with some embodiments of the present disclosure.

FIG. 1 illustrates a computer system topology 48 for estimating errors for a quantum system 64 comprising a set of n qubits 102, where $\mathbb{P}^{\otimes n}$ is the projective n-qubit Pauli group for the quantum system 64, and where n is a fixed integer of three or greater. Referring to FIG. 1, in typical embodiments, the topology includes an optimization computer system 100 that is in electronic communication with a quantum computer (interchangeably referred to as a "quantum system") 64 comprising a plurality of qubits 102. In some embodiments the electronic communication between the optimization computer system 100 and the quantum computer system is over a communication network 106. In some embodiments, the optimization computer system 100 applies suitable quantum codes 62 to the quantum computer 64. In some embodiments, the optimization computer system 100 determines information about the state of the qubits 102 of the quantum computer 64 using one or more measurement devices 60.

For purposes of illustration in FIG. 1, the optimization computer system 100 is represented as a single computer that includes all of the functionality of the disclosed classical computer system. However, the disclosure is not so limited. The functionality of the optimization computer system 100 may be spread across any number of networked computers and/or reside on each of several networked computers. One of skill in the art will appreciate that a wide array of different computer topologies is possible for the analysis computer system 100 and all such topologies are within the scope of the present disclosure.

Figure 2:
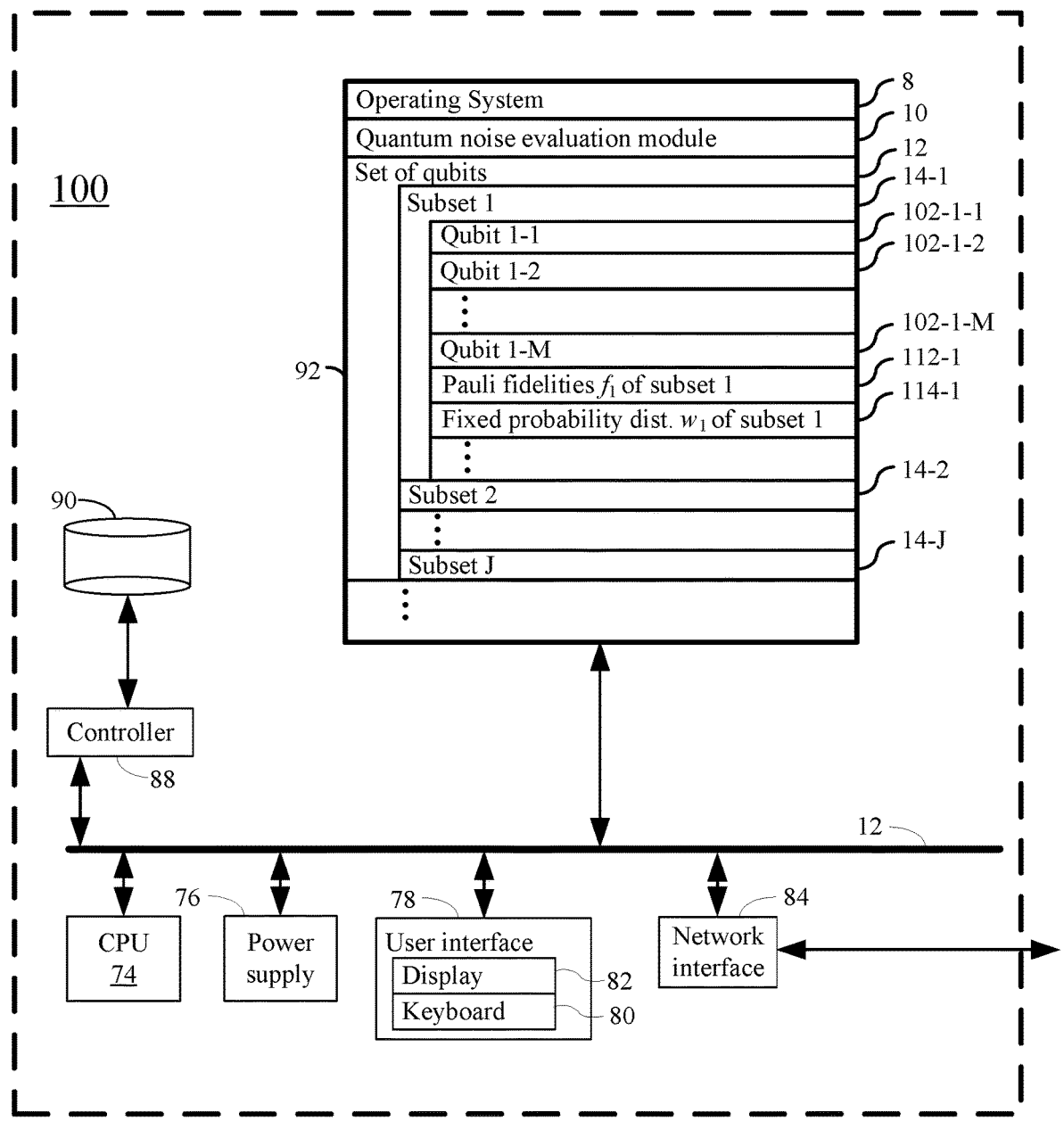
FIG. 2 is a schematic diagram of a classical computer system for estimating errors for a quantum system comprising a set of n qubits, where $\mathbb{P}^{\otimes n}$ is the projective n-qubit Pauli group for the quantum system in accordance with an embodiment of the present disclosure.

Turning to FIG. 2 with the foregoing in mind, an analysis computer system 100 comprises one or more processing units (CPUs) 74, a network or other communications interface 84, a user interface 78 (e.g., including a display 82 and keyboard 80 or other form of input device) a memory 92 (e.g., random access memory), one or more magnetic disk storage and/or persistent devices 90 optionally accessed by one or more controllers 88, one or more communication busses 12 for interconnecting the aforementioned components, and a power supply 76 for powering the aforementioned components. Data in memory 92 can be seamlessly shared with non-volatile memory 90 using known computing techniques such as caching. Memory 92 and/or memory 90 can include mass storage that is remotely located with respect to the central processing unit(s) 74. In other words, some data stored in memory 92 and/or memory 90 may in fact be hosted on computers that are external to analysis computer system 100 but that can be electronically accessed by the analysis computer system over an Internet, intranet, or other form of network or electronic cable using network interface 84.

The memory 92 of analysis computer system 100 stores:

an operating system 8 that includes procedures for handling various basic system services;

a quantum noise evaluation module 10 for estimating errors for a quantum computer comprising a plurality of qubits in the form of a set 12 of qubits 102;

a plurality of subsets 14 of the set 12 of qubits, each respective subset 14 including qubits 102 in the set of qubits 12 and characterized by Pauli fidelities $f_J$ 112 and a fixed probability distribution $\omega_J$ 114.

In some implementations, one or more of the above identified data elements or modules of the analysis computer system 100 are stored in one or more of the previously disclosed memory devices, and correspond to a set of instructions for performing a function described above. The above identified data, modules or programs (e.g., sets of instructions) need not be implemented as separate software programs, procedures or modules, and thus various subsets of these modules may be combined or otherwise re-arranged in various implementations. In some implementations, the memory 92 and/or 90 optionally stores a subset of the modules and data structures identified above. Furthermore, in some embodiments the memory 92 and/or 90 stores additional modules and data structures not described above.

Figure 3:
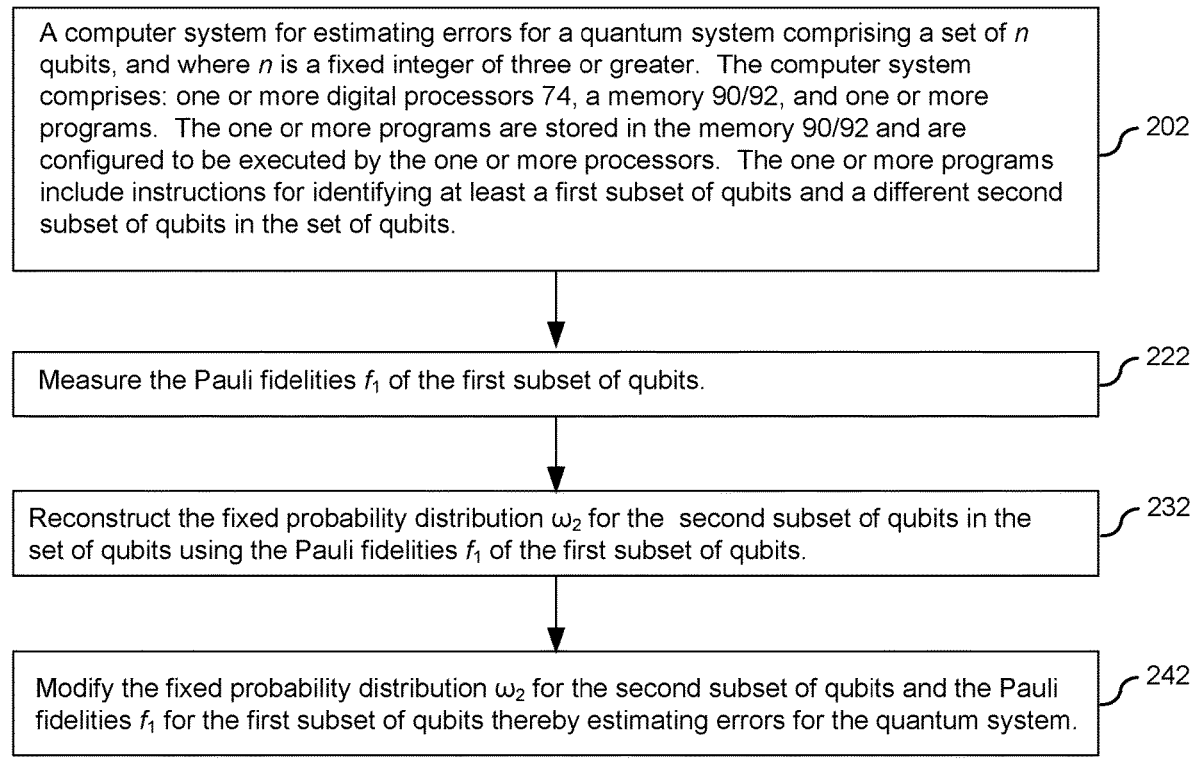
FIG. 3 is a flow chart showing an example quantum computation process in accordance with an embodiment of the present disclosure.

Now that a system for estimating errors for a quantum system comprising a plurality of qubits, have been described methods for estimating errors for a quantum system are disclosed below with reference to FIG. 3.

Preliminaries.

In the present disclosure, $$I = \begin{pmatrix} 1 & 0 \\ 0 & 1 \end{pmatrix}, X = \begin{pmatrix} 0 & 1 \\ 1 & 0 \end{pmatrix}, Y = \begin{pmatrix} 0 & i \\ -i & 0 \end{pmatrix}, Z = \begin{pmatrix} 1 & 0 \\ 0 & -1 \end{pmatrix} \quad (1)$$

are the single-qubit Pauli matrices, $\mathbb{P} = \{I, X, Y, Z\}$ is the single-qubit (projective) Pauli group, and $\mathbb{P}^{\otimes n}$ is the n-fold tensor product of $\mathbb{P}$ for any fixed integer n and $d=2^n$. The Pauli P-fidelity of a linear map $\mathcal{L}: \mathbb{C}^{d \times d}$ is defined to be $$f_P(\mathcal{L}) = Tr[P\mathcal{L}(P)]/d \quad (2)$$

A linear map $\mathcal{L}$ is a Pauli channel when $$\mathcal{L}(P) = f_P(\mathcal{L}) P \forall P \in \mathbb{P}^{\otimes n}, \quad (3)$$

or, equivalently, when there exists a probability distribution $\{\omega(P|\mathcal{L})\}$ over $\mathbb{P}^{\otimes n}$ such that (Holev, A. S., 2005, "Additivity Conjecture and Covariant Channels," International Journal of Quantum Information, 3(01), pg. 41)

$$\mathcal{L}(A) = \sum_{P \in \mathbb{P}^{\otimes n}} \omega(P|\mathcal{L}) PAP. \quad (4)$$

For any subset $\mathbb{S}$ of the Pauli group and any group $\mathbb{G}$ of Pauli matrices, we define the centralizer of $\mathbb{S}$ to be $$C(\mathbb{S}) = \{h \in \mathbb{P}^{\otimes n} : hs = sh \forall s \in \mathbb{S}\}, \quad (5)$$

and vectors $f_{\mathbb{S}}$ and $\omega_{\mathbb{S},\mathbb{G}}$ indexed by elements of $\mathbb{S}$ such that $$\left[f_{\mathbb{S}}(\mathcal{L})\right]_P = f_P(\mathcal{L}) \quad (6)$$

$$\left[\omega_{\mathbb{S},\mathbb{G}}(\mathcal{L})\right]_P = \sum_{G \in \mathbb{G}} \omega(PG|\mathcal{L})$$

for all $P \in \mathbb{S}$. We refer to $\omega_{\mathbb{S},\mathbb{G}}(\mathcal{L})$ as a marginal distribution because it is marginalized over $\mathbb{G}$. For any Pauli matrices P, $Q \in \mathbb{P}^{\otimes n}$, we define $$\chi(P, Q) = \begin{cases} 1 & \text{if } [P, Q] = 0 \\ -1 & \text{otherwise.} \end{cases} \quad (7)$$

For any subsets $\mathbb{S}$ and $\mathbb{T}$ of the Pauli group, we define the matrix $\chi^{\mathbb{S},\mathbb{T}}$ indexed by elements of $\mathbb{S}$ and $\mathbb{T}$ such that $$(\chi^{\mathbb{S},\mathbb{T}})_{P,Q} = \chi(P,Q) \quad (8)$$

for all $P \in \mathbb{S}$ and $Q \in \mathbb{T}$. The entries of f can be efficiently estimated via, e.g., direct fidelity estimation (Flammia et al., 2011, "Direct Fidelity Estimation from Few Pauli Measurements," Physical Review Letters, 106(23), Print). See, U.S. Patent Application No. 62/535,953, entitled "SYSTEMS AND METHODS FOR LOCAL RANDOMIZED BENCHMARKING," which is hereby incorporated by reference.

General noise under Pauli twirls. In some aspects of the present disclosure, the disclosed systems and methods make use of protocols formulated in terms of reconstructing a Pauli noise model that generates a given set of Pauli fidelities. This is done for ease of analysis. To connect more readily with physical noise mechanisms and to enable experimentalists to compensate errors identified by the disclosed reconstruction, we begin by disclosing how Pauli error rates of the twirl of a channel ε relate to Kraus operators of the untwirled channel.

Any completely positive and trace preserving (CPTP) map has a Kraus operator representation $$\mathcal{E}(\rho) = \sum_A A\rho A^\dagger. \quad (9)$$

As the Pauli matrices are a Hermitian orthogonal basis for $\mathbb{C}^{d\times d}$, we can write $$A = \sum_{P \in \mathbb{P}^N} A_P P \qquad (10)$$

for scalars $A_P = \mathrm{Tr}\, P^\dagger A / \mathrm{Tr}\, P^\dagger P$. The Pauli twirl of a map $\varepsilon$ is the linear map $\bar{\varepsilon}$ with a Kraus operator representation $$\bar{\mathcal{E}}(\rho) = 4^{-N} \sum_{P \in \mathbb{P}^{\otimes n}} P^\dagger A \rho P^\dagger A P. \qquad (11)$$

Substituting eq. (10) into eq. (11) and rearranging the sum gives $$\bar{\mathcal{E}}(\rho) = \sum_A \sum_{Q,R \in \mathbb{P}^{\otimes n}} A_Q A_R^* Q \rho R \left( 4^{-N} \sum_{P \in \mathbb{P}^{\otimes n}} \chi(Q,P)\chi(R,P)^* \right). \qquad (12)$$

For any fixed Q, $\chi(Q,P)$ is a real-valued character of the Pauli group. Moreover, $\chi(Q,P)$ and $\chi(R,P)$ are inequivalent representations for any distinct Q, $R \in \mathbb{P}^{\otimes n}$.. Therefore by Schur's orthogonality relations, eq. (12) evaluates to the Pauli channel $$\bar{\mathcal{E}}(\rho) = \sum_A A\rho A^\dagger = \sum_Q \left( \sum_A |a_Q|^2 \right) Q\rho Q. \qquad (13)$$

That is, the Pauli error rate $\omega(Q)$ of the twirled channel is the sum of the absolute values of the inner products between Pauli matrices and any choice of Kraus operators for the channel.

Reconstructing Pauli Error Rates.

We now disclose systems and methods for reconstructing an unknown Pauli channel acting on n qubits. All plausible errors in a marginal distribution are reconstructed, errors are removed that have a probability below some threshold, and then additional measurements are made to distinguish errors that were previously marginalized (c.f. eq. (6)).

Let $S \subseteq \mathbb{P}^{\otimes n}$ be a subgroup of the Pauli group and $T \subseteq \mathbb{P}^{\otimes n}$ be any subset of the Pauli group. Substituting eq. (4) into eq. (2) gives $$f_\mathbb{T} = \chi_{\mathbb{T},S} \omega_{S,C(S)}, \qquad (14)$$

where we omit the arguments corresponding to the unknown channel. When $T = \mathbb{P}^{\otimes n}$, the columns are one-dimensional representations of $\mathbb{P}^{\otimes n}$ and are manifestly inequivalent by the definition of $S^\perp$. Therefore by Schur's orthogonality relations, $$\chi^\dagger_{\mathbb{P}^{\otimes n}, S} \chi_{\mathbb{P}^{\otimes n}, S} = \mathbb{P}^{\otimes n} I, \qquad (15)$$

and so, in particular, there exist sets $\mathbb{T}$ such that eq. (14) is invertible. For such sets $\mathbb{T}$ and for any vector $f_\mathbb{T}$, eq. (14) can be uniquely solved to estimate the marginal distribution $\omega_S$. Moreover, for any subset $\mathbb{R}$, estimates of entries of $\omega_{S,C(S)}$ for $S \in \mathbb{S} - \mathbb{R}$ can be substituted into eq. (14) to obtain $$f_\mathbb{T} = \chi_{\mathbb{T},\mathbb{R}} \omega_{\mathbb{R},C(S)} + \chi_{\mathbb{T},S-\mathbb{R}} \omega_{S-\mathbb{R},C(S)}, \qquad (16)$$

where the term $\chi_{\mathbb{T},S-\mathbb{R}} \omega_{S-\mathbb{R},C(S)}$ can either be evaluated or neglected. Elements of $\mathbb{T}$ can then be removed while still allowing eq. (16) to be solved.

A method to reconstruct an arbitrary distribution is to repeatedly perform the following with successively larger subsets.

1. Choose K subsets $\mathbb{R}_1,\ldots,\mathbb{R}_K \subseteq \mathbb{P}^{\otimes n}$ such that for $k=1, \ldots, K$, the marginal distributions $\omega_{(\mathbb{R}_k)-\mathbb{R}_k, C(\mathbb{R}_k)}$ are known, approximately known, or can be neglected.
2. For each subset $\mathbb{R}_k$, choose a set $\mathbb{T}_k$ of Pauli matrices so that eq. (16) can be uniquely solved.
3. Estimate the Pauli fidelities $f_{\mathbb{T}_k}$ for each $k=1,\ldots,K$.
4. Reconstruct the marginal distributions $\omega_{\mathbb{R}_k,C(\mathbb{R}_k)}$ for each $k=1,\ldots,K$.

One embodiment of the above method is as follows. Let $\mathbb{P}_J$ be the subgroup of $\mathbb{P}^{\otimes n}$ that act as the identity on all qubits not in a subset $J \subseteq C\{1,\ldots,n\}$. Then one can choose the subsets in the first iteration to be $\mathbb{R}_{0,k} = \mathbb{T}_{0,k} = \mathbb{P}_{\{k\}}$ for $k=1,\ldots,n$. Let the number of subsets at the jth iteration be $K_j$, with $K_1 = n$. Then at the (j+1)th iteration, the Pauli subsets can be chosen to be $$\mathbb{R}_{j+1,k} \subseteq \mathbb{R}_{j,2k-1} \times \mathbb{R}_{j,2k}$$

$$\mathbb{T}_{j+1,k} \subseteq \mathbb{T}_{j,2k-1} \times \mathbb{T}_{j,2k} \qquad (17)$$

for $k=1,\ldots,\lfloor K_j/2 \rfloor$, with $\mathbb{R}_{j+1,\lceil K_j/2 \rceil} \subseteq \mathbb{R}_{j,K_j}$ and $\mathbb{T}_{j+1,\lceil K_j/2 \rceil} \subseteq \mathbb{T}_{j,K_j}$ if $K_j$ is odd. After reconstructing the marginal distributions $\omega_{\mathbb{R}_{j,k},C(\mathbb{R}_{j,k})}$, one can remove elements of $\mathbb{R}_{j,k}$ that, for example, have negligible probability or are believed to arise from a known error mechanism.

CONCLUSION AND REFERENCES CITED

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a nontransitory computer readable storage medium. For instance, the computer program product could contain the program modules shown in any combination of FIG. 1 or 2 or described in FIG. 3. These program modules can be stored on a CD-ROM, DVD, magnetic disk storage product, USB key, or any other non-transitory computer readable data or program storage product.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations described herein were chosen and described in order to best explain the principles of the invention and its practical applications, to thereby enable others skilled in the art to best utilize the invention and various implementations with various modifications as are suited to the particular use contemplated.

What is claimed:

1. A computer system for estimating errors for a quantum system comprising a set of n qubits, wherein $\mathbb{P}^{\otimes n}$ is the projective n-qubit Pauli group for the quantum system, and wherein n is a fixed integer of three or greater, the computer system comprising:
   one or more processors;
   a memory; and
   one or more programs, wherein the one or more programs are stored in the memory and are configured to be executed by the one or more processors, the one or more programs including instructions for:
identifying at least a first subset of Pauli matrices and a second subset of Pauli matrices;
estimating a plurality of Pauli fidelities $f_1$ of the first subset of Pauli matrices; and
reconstructing a marginal probability distribution $\omega_2$ for the second subset of Pauli matrices using the Pauli fidelities $f_1$ of the first subset of Pauli matrices, thereby estimating errors for the quantum system.

2. The system of claim 1, wherein $f_1$ is determined by cycle benchmarking or direct fidelity estimation.

3. The system of claim 1, wherein all elements of the second subset of Pauli matrices act trivially on at least one of the qubits.

4. The system of claim 1, wherein at least one element of the second subset of Pauli matrices acts nontrivially on at least three of the qubits.

5. The system of claim 1, the method further comprises determining the marginal probability distribution $\omega_2$ over $\mathbb{P}_1$ for the first subset of qubits by a relation comprising:

$$f_1 = \chi \omega_2 + v \quad (18)$$

for some vector v, wherein the sign of the entries of $\chi$ depends on whether the corresponding elements of the first and second subsets of Pauli matrices commute.

6. The system of claim 1, wherein the method further comprises using the reconstructed marginal probability distribution $\omega_2$ to choose at least a third and a fourth subset of Pauli matrices and repeating the method in the respective claim using the third and fourth subset of Pauli matrices.

7. The system of claim 6, wherein the third subset of Pauli matrices is chosen to contain the first subset of Pauli matrices and the fourth subset of Pauli matrices is chosen to contain the second subset of Pauli matrices.

8. The system of claim 7, wherein elements of the third and fourth subsets of Pauli matrices are removed based on the reconstructed marginal probability distribution for the second subset of Pauli matrices.

9. The system of claim 1, wherein the errors for the quantum system is estimated as an unknown Pauli channel acting on the set of qubits.

10. The system of claim 1, wherein the one or more programs further include instructions for assessing the correctness of an output using the estimated errors.

11. The system of claim 1, wherein the one or more programs further include instructions for calibrating one or more control Hamiltonians of the quantum system using the estimated errors.

12. The system of claim 1, wherein the one or more programs further include instructions for using the estimated errors to choose a plurality of recovery operators for one or more syndromes in an error-correcting code applied to the quantum system.

13. A method for estimating errors for a quantum system comprising a set of n qubits, wherein $\mathbb{P}^{\otimes n}$ is the projective n-qubit Pauli group for the quantum system, and wherein n is a fixed integer of three or greater, comprising:
a computer system comprising one or more data processors and a memory, the memory comprising non-transitory instructions configured to perform a procedure comprising:
identifying at least a first subset of Pauli matrices and a second subset of Pauli matrices;
estimating a plurality of Pauli fidelities $f_1$ of the first subset of Pauli matrices; and
reconstructing a marginal probability distribution $\omega_2$ for the second subset of Pauli matrices using the Pauli fidelities $f_1$ of the first subset of Pauli matrices, thereby estimating errors for the quantum system.

14. A non-transitory computer readable storage medium, for estimating errors for a quantum system comprising a set of n qubits, wherein $\mathbb{P}^{\otimes n}$ is the projective n-qubit Pauli group for the quantum system, and wherein n is a fixed integer of three or greater, the non-transitory computer readable storage medium storing one or more programs, the one or more programs comprising instructions, which when executed by a computer system with one or more processors, cause the computer system to:
identify at least a first subset of Pauli matrices and a second subset of Pauli matrices;
estimate a plurality of Pauli fidelities $f_1$ of the first subset of Pauli matrices; and
reconstruct a marginal probability distribution $\omega_2$ for the second subset of Pauli matrices using the Pauli fidelities $f_1$ of the first subset of Pauli matrices, thereby estimating errors for the quantum system.

\* \* \* \* \*